United States Patent [19]

Birzer

[11] Patent Number: 4,899,252
[45] Date of Patent: Feb. 6, 1990

[54] MOUNTING FOR A CONTROL DEVICE

[75] Inventor: Josef Birzer, Schwandorf, Fed. Rep. of Germany

[73] Assignee: Siemens Aktiengesellschaft, Berlin and Munich, Fed. Rep. of Germany

[21] Appl. No.: 318,072

[22] Filed: Mar. 2, 1989

[30] Foreign Application Priority Data

Mar. 3, 1988 [DE] Fed. Rep. of Germany ....... 8802896

[51] Int. Cl.⁴ .............................................. H02B 1/04
[52] U.S. Cl. ..................................... 361/350; 174/48; 200/296; 248/27.3; 361/346; 361/419
[58] Field of Search .................. 174/48; 439/716, 544, 439/548, 559, 563, 564; 200/295, 296; 248/27.1, 27.3; 361/331, 380, 346–348, 350, 392, 417, 419 420

[56] References Cited

U.S. PATENT DOCUMENTS 4,293,895 10/1981 Kristofek ........................... 248/27.3
4,698,726 10/1987 Ootsuka .............................. 439/716
4,816,966 3/1989 Frankowski ........................ 361/346

FOREIGN PATENT DOCUMENTS 1956645 10/1966 Fed. Rep. of Germany .
1956647 10/1966 Fed. Rep. of Germany .
7712822 4/1977 Fed. Rep. of Germany .
7712822 7/1977 Fed. Rep. of Germany . .
3418845 11/1985 Fed. Rep. of Germany .
569595 8/1958 France .

Primary Examiner—Gerald P. Tolin
Attorney, Agent, or Firm—Kenyon & Kenyon

[57] ABSTRACT

An arrangement for mounting a control device in a control panel. The arrangement includes a solid flange having a cylinder which penetrates the control panel and is fixed by means of a holder. Locking bolts, arranged in the holder engage in corresponding recesses of the cylinder. Clamping bolts, screwed into the holder, support the holder against the control panel so as to effect a bracing of the solid flange with the control panel and compensate for variable thickness in the control panel.

6 Claims, 2 Drawing Sheets

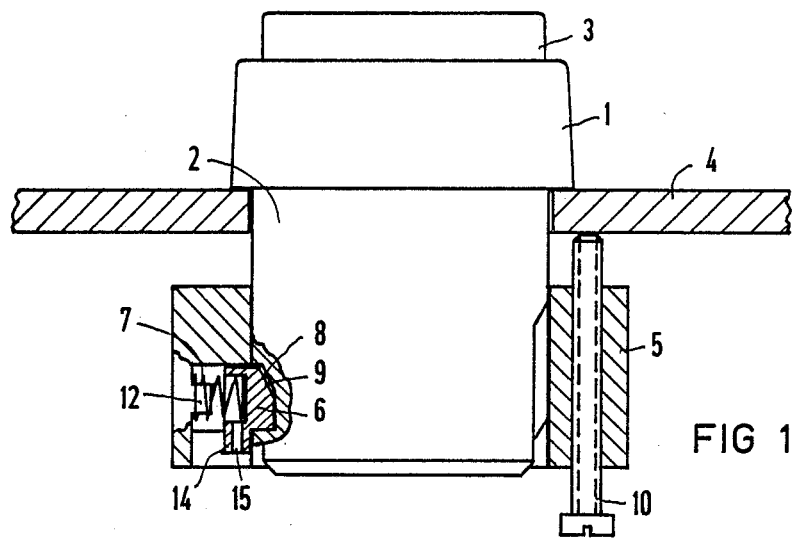
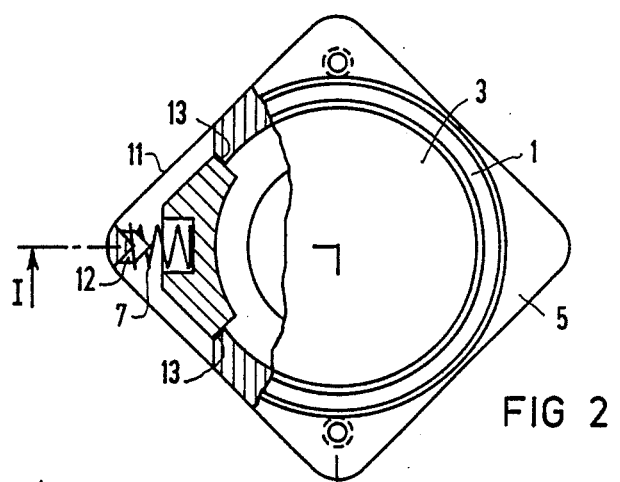
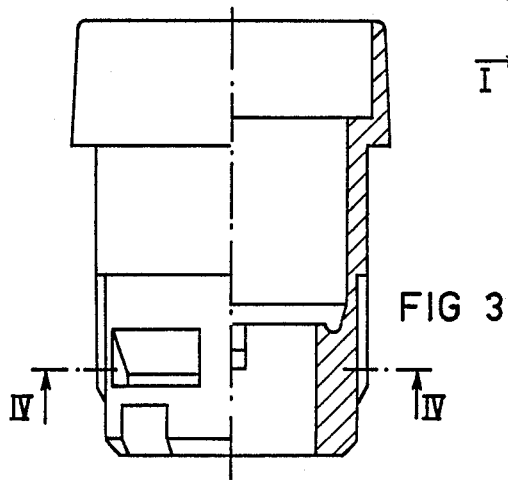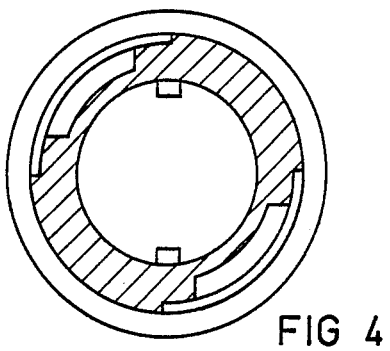

MOUNTING FOR A CONTROL DEVICE

BACKGROUND OF THE INVENTION

The present invention relates to an arrangement for mounting a control device in a control panel. The control device comprises a control switch mechanism with a solid flange, which has a cylinder that penetrates a borehole in a control panel. The cylinder includes a bezel or rim-like abutment which rests on one side of the control panel. On the other side of the control panel, the cylinder can be joined to a holder. Clamping bolts are screwed into the holder and serve to brace the holder and hence the solid flange against the control panel. The provision of the clamping bolts make it possible to compensate for variable thickness in the control panel.

German Design Patent 77 12 822 describes a known control switch of the above mentioned type. More specifically, the patent describes an arrangement wherein the solid flange and the holder are coupled in the manner of a bayonet joint. By virtue of this construction, when rectangular solid flanges or holders are used, a mounting frame large enough to accommodate the diagonal dimensions of these parts is needed. This is due to the fact that in order to have a bayonet coupling the parts must be twisted or turned with respect to each other.

German Design Patent 19 56 645 discloses a known procedure in the application of a square solid flange. Specifically, this patent discloses screwing a nut on the cylinder on the side opposite the control panel. In this case, a special tool is required to tighten the nut.

SUMMARY OF THE INVENTION

The present invention obviates the problems experienced with known constructions. In particular, the present invention provides a mounting arrangement with a simple design which requires no special tools, and which makes it possible to mount several devices next to each other in dense latching arrangement. More specifically, the present invention provides an arrangement in which the holder may be simply snapped on such that no tool is necessary as with the ring nut mounting and no rotary motion is necessary, as with the above described bayonet coupling.

The foregoing advantages are achieved using a simple coupling structure and method, whereby the coupling between the solid flange and the holder consists of at least two diagonally opposed locking bolts arranged on the holder. The locking bolts are biased radially inward by a spring and can be pressed back against the spring tension. In the extended position, the locking bolts are adapted to engage in recesses formed in the cylinder.

To allow the locking bolts to function extensively, they preferably have a ring-shaped outside contour with sloping abutment surfaces which are adapted to an annular slot in the cylinder. The sloping abutment surfaces ensure that the holder is easily positioned on the cylinder.

In order to locate the clamping bolts in the holder in a manner which does not enlarge the contour of the holder, the holder preferably has a square shape and the locking bolts are arranged in two diagonally opposed corner points.

The holder has feeding or insertion holes for the locking bolts which run diagonally or transversely to the movement direction of the locking bolts. Thus, a simple support for the locking bolts is provided without requiring additional parts. Further, stop edges are provided to limit the movement of the locking bolts and supporting surfaces for the locking bolt springs extend from or are tip-stretched in the feeding hole.

To enable easy disengagement of the holder and the solid flange, the arrangement preferably includes return pins which are tip-stretched on or extend from the locking bolts to a location accessible from the remote side of the holder, relative to the flange.

Finally, to prevent the holder from being improperly positioned on the cylinder, guiding lugs are preferably provided on the cylinder and holder.

BRIEF DESCRIPTION OF THE DRAWINGS

FIG. 1 illustrates in a lateral view, partially in cross-section, the solid flange and holder, installed;

FIG. 2 illustrates a top view of the holder in the area of the locking bolt, in a cut-away view;

FIG. 3 illustrates a lateral view of the solid flange;

FIG. 4 illustrates a cross-section across the line IV—IV of FIG. 3;

DETAILED DESCRIPTION OF THE INVENTION

Figure 7:
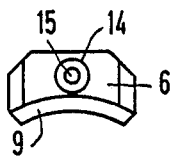
FIG. 7 illustrates a top view of the locking bolt.
Figure 6:
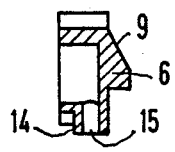
FIG. 6 illustrates a lateral view of the locking bolt.
Figure 5:
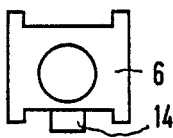
FIG. 5 illustrates a front view of the locking bolt.
Figure 9:
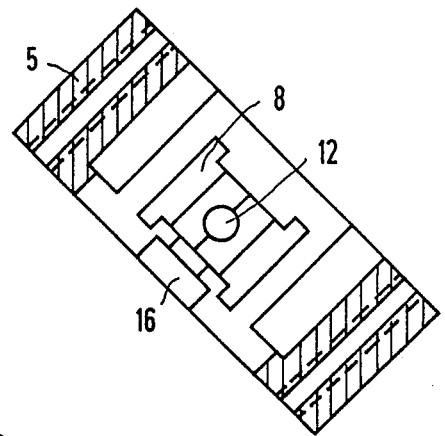
FIG. 9 illustrates a lateral section of the holder.
Figure 8:
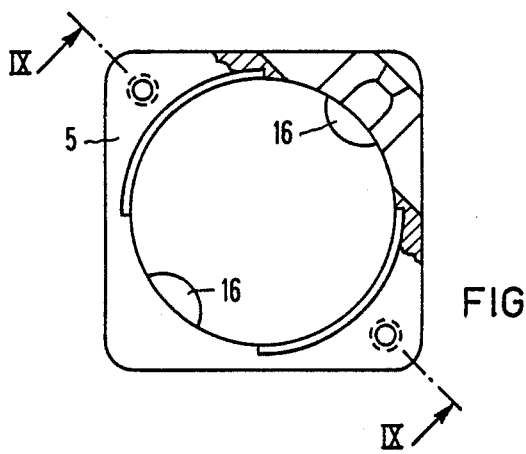
FIG. 8 illustrates a top view of the holder.

The control switch mechanism represented in FIG. 1 includes a solid flange 1 having a cylinder 2 extending from or tip-stretched on it, whereby the actuating element 3 for the control switch is supported for sliding. The cylinder 2 penetrates or extends through a control panel 4 and is supported with a bezel or rim-like abutment on the control panel. The cylinder is joined to a holder 5 with a snap-on connection.

The snap-on connection is achieved through the use of locking bolts 6. The locking bolts 6 are slidably supported on the holder and are spring-loaded by a spring 7 in the direction of the cylinder 2. Recesses 8 are provided in the cylinder 2. The recesses 8 are adapted to the shape of the locking bolts 6 and, in the illustrated example, are designed as portions of an annular slot. The locking bolts 6 include sloping abutment surfaces 9, so that they can be automatically pressed back, when the cylinder is pressed in, and can snap in the correct position in the recess 8.

Clamping bolts 10, screwed into the holder 5, serve to brace the solid flange with respect to the control panel 4. As shown in FIG. 2, the clamping bolts 10 are screwed into two diagonally opposed corner points of the square-designed holder 5. The locking bolts are mounted on the corner points of the holder 5, diagonally opposed to one another and adjacent to both of these screws.

Feeding holes 11, which extend crosswise or transverse to the sliding direction of the locking bolts, allow insertion of the locking bolt 6 into the holder 5. At the moment of insertion, the spring 7 is fully compressed (i.e., compressed to block dimensions). After insertion of the locking bolt, the spring is supported on a bracing pin 12. Stop edges 13 of the opening 11 serve to limit the movement of the locking bolts in the direction of the feeding hole in the holder 5 for the cylinder 2. Return pins 14 can be mounted on or integrally formed with the locking bolts. In the latter case, the feeding hole is to be provided with a corresponding groove. The return pins 14 include openings 15, designed to receive a screw driver or a clamp, which would be able to simultaneously retract both locking bolts.

Guide projections 16 can be provided in the holder 5, provided corresponding grooves are formed in the cylinder, to attain an exact alignment or correlation, upon insertion, between the solid flange and the holder.

Thus, in accordance with the present invention, a design is created, which enables the holder to be simply snapped on without the use of tools or rotary motion.

What is claimed:

1. An arrangement for mounting a control switch mechanism in a control panel;
   the control panel having a first side, a second side and a borehole extending between the first side and the second side;
   the control switch mechanism including a rim portion and a cylindrical portion, the rim portion resting on the first side of the control panel, the cylindrical portion extending through the borehole and including a plurality of recesses;
   a holder, for connecting the cylindrical portion to the second side of the control panel, the holder having a first side facing the second side of the control panel and a second side which is remote from the control panel and the holder including an opening for receiving the cylindrical portion, the holder further comprising a plurality of symmetrically disposed locking bolts, the locking bolts being slidable in a predetermined direction between a first position in which the bolts extend into the opening and a second position in which the locking bolts do not extend into the opening, and a spring associated with each one of the plurality of locking bolts for biasing the locking bolts toward the first position, the locking bolts being movable against the bias of the springs into the second position and each one of the plurality of locking bolts being movable into the opening and into engagement with one of the plurality of recesses formed in the cylindrical portion when the cylindrical portion is received in the opening; and
   a plurality of clamping bolts, each clamping bolt being screwed into the holder and including a portion engaging the second side of the control panel.

2. The arrangement of claim 1, wherein the plurality of recesses formed in the cylinder comprise annular slots having a predetermined shape and the locking bolts having a shape which includes a ring-shaped outside contour and sloping abutment surfaces which are complementary to the predetermined shape of the annular slots.

3. The arrangement of claim 1 wherein the holder has a square shape having four corner points and the locking bolts are arranged in two of the corner points which are diagonally opposed.

4. The arrangement of claim 3 wherein the locking bolts each include a feeding hole extending transverse to the direction of sliding of the locking bolts to allow insertion of the locking bolts into the holder;
   at least one abutment which defines the first position by limiting movement of the locking bolts into the opening; and
   a locking bolt support surface extending into the feeding hole.

5. The arrangement of claim 1, wherein each locking bolt includes a return pin extension, said return pin extension being accessible from the remote side of the holder.

6. The arrangement of claim 1 wherein guiding lugs are provided on the cylinder and the holder.

* * * * *